United States Patent
Lee

(10) Patent No.: US 7,618,169 B1
(45) Date of Patent: Nov. 17, 2009

(54) LIGHT PROJECTING REAR VIEW MIRROR APPARATUS

(76) Inventor: Herbert Lee, 4085 S. River La., Ellenwood, GA (US) 30294

( * ) Notice: Subject to any disclaimer, the term of this patent is extended or adjusted under 35 U.S.C. 154(b) by 79 days.

(21) Appl. No.: 11/669,816

(22) Filed: Jan. 31, 2007

(51) Int. Cl.
*B60Q 1/26* (2006.01)

(52) U.S. Cl. .................. 362/494; 362/529; 362/531

(58) Field of Classification Search ............... 362/487, 362/494, 523, 529, 285, 287, 418, 427, 53
See application file for complete search history.

(56) References Cited

U.S. PATENT DOCUMENTS

| | | | |
|---|---|---|---|
| 4,809,137 A | * | 2/1989 | Yamada ...................... 362/494 |
| 6,347,880 B1 | | 2/2002 | Furst et al. |
| 6,582,109 B2 | | 6/2003 | Miller |
| 6,811,288 B2 | * | 11/2004 | Hutzel ........................ 362/494 |
| 6,848,816 B2 | | 2/2005 | Gilbert et al. |
| 7,270,430 B2 | * | 9/2007 | Olijnyk et al. .............. 359/841 |
| 7,287,867 B2 | * | 10/2007 | Wellington et al. ......... 359/841 |

* cited by examiner

*Primary Examiner*—Thomas M Sember
(74) *Attorney, Agent, or Firm*—Crossley Patent Law; Mark A. Crossley

(57) ABSTRACT

A light projecting rearview mirror apparatus comprises a telescopic mirror housing with fully pivoting light case on a bottom of the housing. Further, the housing rotates for added lighting directional control. The apparatus is fitted as replacement or original equipment and provides for safely lighting adjacent to an auto at night.

6 Claims, 3 Drawing Sheets

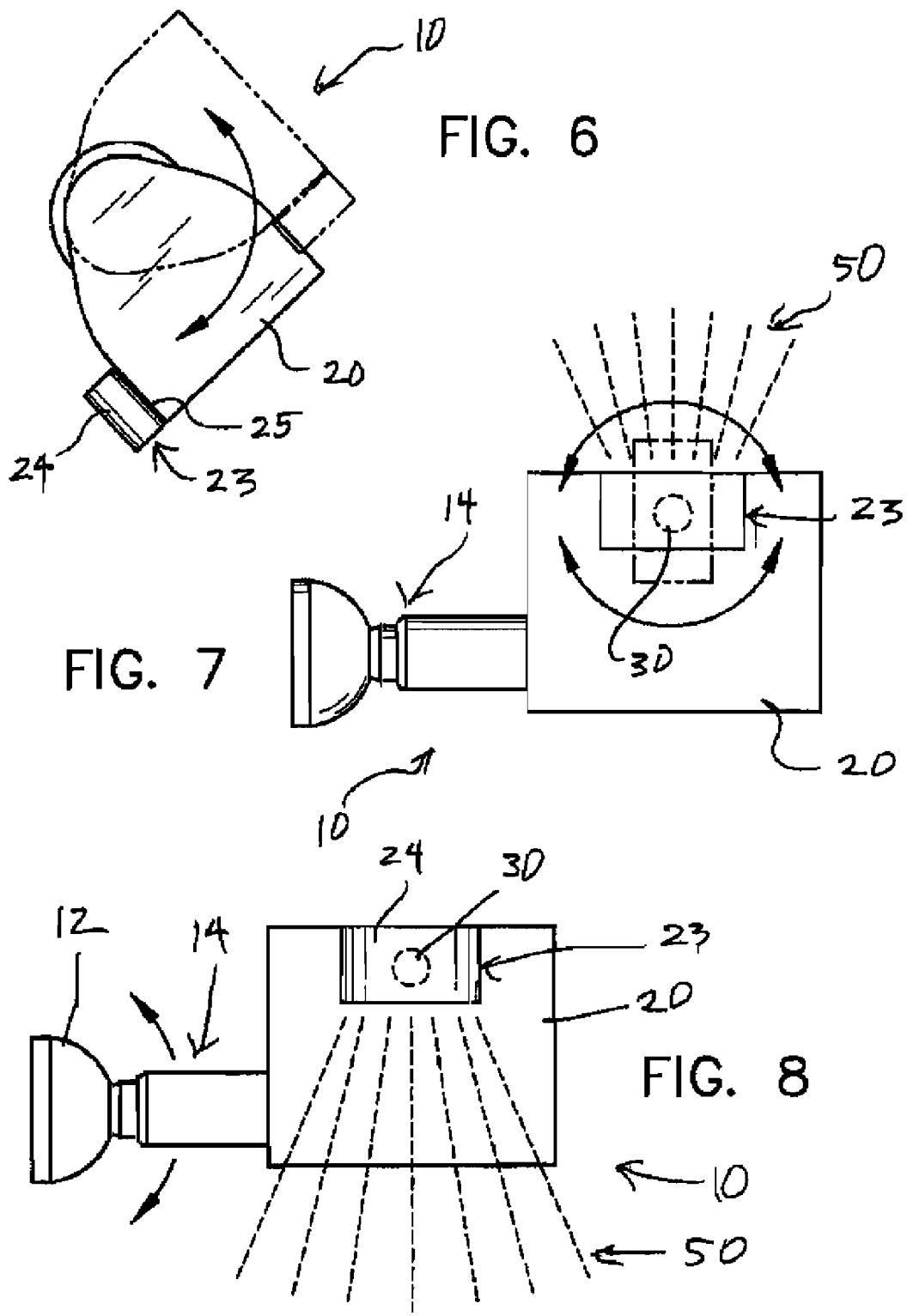

LIGHT PROJECTING REAR VIEW MIRROR APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

With automobiles, nighttime problems and emergencies are frequent. Changing a flat tire, inspecting the sides of a vehicle, searching for objects, and a host of other situations arise. However, proper lighting is not typically provided with an automobile in order to assist in such situations. The present apparatus provides extendable, adjustable lighting, from an exterior rear view mirror, so that night time needs can be safely and easily met.

FIELD OF THE INVENTION

The light projecting rearview mirror apparatus relates to automobile exterior mirrors and more especially to a telescoping exterior mirror with pivotal, rotational lighting.

DESCRIPTION OF THE PRIOR ART

Prior related art U.S. Pat. No. 6,848,816B2 to Gilbert et al. 2005 Feb. 1 teaches an exterior mirror which includes an approach light in the attachment assembly. The device is electronically complex relative to the present apparatus. The device does not provide the telescopic and rotational light capabilities of the present apparatus. U.S. Pat. No. 6,582,109B2 to Miller 2003 Jun. 24 teaches an illumination device for exterior mirror. The device comprises a bulb holder. The device does not provide the telescoping, rotational, and pivotal advantages of the present apparatus. U.S. Pat. No. 6,347,880B1 to Furst et al. 2002 Feb. 19 teaches a lighting device for attachment to a motor vehicle. The device does not provide the telescopic, rotational, and pivotal capabilities of the present apparatus.

While the above-described devices fulfill their respective and particular objects and requirements, they do not describe a light projecting rearview mirror apparatus that provides for the advantages of the present light projecting rearview mirror apparatus. In this respect, the present light projecting rearview mirror apparatus substantially departs from the conventional concepts and designs of the prior art. Therefore, a need exists for an improved light projecting rearview mirror apparatus.

SUMMARY OF THE INVENTION

The general purpose of the light projecting rearview mirror apparatus, described subsequently in greater detail, is to provide a light projecting rearview mirror apparatus which has many novel features that result in an improved light projecting rearview mirror apparatus which is not anticipated, rendered obvious, suggested, or even implied by prior art, either alone or in combination thereof.

To attain this, the light projecting rearview mirror apparatus combines exterior rear view mirrors with a telescoping, rotatable, directionally adjustable light. By providing outward telescopic capability in the exterior rear view mirror, the light can be moved away from a side of the auto as needed, to better cover otherwise shielded areas with light. The apparatus is produced to accommodate various makes of automobiles, the better to aesthetically mate with the auto's design. For the same reason, overall shapes of the apparatus therefore vary. Further, while telescoping capability also varies with make of auto, each mirror housing telescopes from 2-3 inches outwardly. The light case is pivotally positioned on the bottom of the mirror housing. The top of the light case is flat to best mate with the mirror housing. The bottom of the light case is convex for aesthetic and aerodynamic reasons. The light case pivots a full 360 degrees for accurately directing light as desired. Additionally, the mirror housing rotates to best position the light as needed. With the telescoping stalk of the mirror housing, 180 rotational capability of the mirror housing, and 360 degree pivot of the light case, virtually any area next to or near the automobile can be lit.

Thus has been broadly outlined the more important features of the improved light projecting rearview mirror apparatus so that the detailed description thereof that follows may be better understood and in order that the present contribution to the art may be better appreciated.

An object of the light projecting rearview mirror apparatus is to insure motorist safety in needed situations.

Another object of the light projecting rearview mirror apparatus is to provide exterior lighting around the automobile.

A further object of the light projecting rearview mirror apparatus is to directionally adjustable lighting around the automobile.

An added object of the light projecting rearview mirror apparatus is to provide telescoping lighting around the automobile.

And, an object of the light projecting rearview mirror apparatus is to combine exterior automobile lighting with a rear view mirror.

Still another object of the light projecting rearview mirror apparatus is to insure aesthetic appeal of the apparatus.

These together with additional objects, features and advantages of the improved light projecting rearview mirror apparatus will be readily apparent to those of ordinary skill in the art upon reading the following detailed description of presently preferred, but nonetheless illustrative, embodiments of the improved light projecting rearview mirror apparatus when taken in conjunction with the accompanying drawings.

In this respect, before explaining the current embodiments of the improved light projecting rearview mirror apparatus in detail, it is to be understood that the light projecting rearview mirror apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved light projecting rearview mirror apparatus. It is therefore important that the claims be regarded as including such equivalent constructions insofar as they do not depart from the spirit and scope of the light projecting rearview mirror apparatus. It is also to be understood that the phraseology and terminology employed herein are for purposes of description and should not be regarded as limiting.

BRIEF DESCRIPTION OF THE DRAWINGS

FIG. 6 is an end elevation view illustrating mirror housing rotational capability.

FIG. 7 is a bottom plan view illustrating light case pivotal capability.

FIG. 8 is a bottom plan view with light rays emanating backwardly from the mirror housing via backward pivot of the light case.

DETAILED DESCRIPTION OF THE DRAWINGS

With reference now to the drawings, and in particular FIGS. 1 through 8 thereof, the principles and concepts of the light projecting rearview mirror apparatus generally designated by the reference number 10 will be described.

Figure 1:
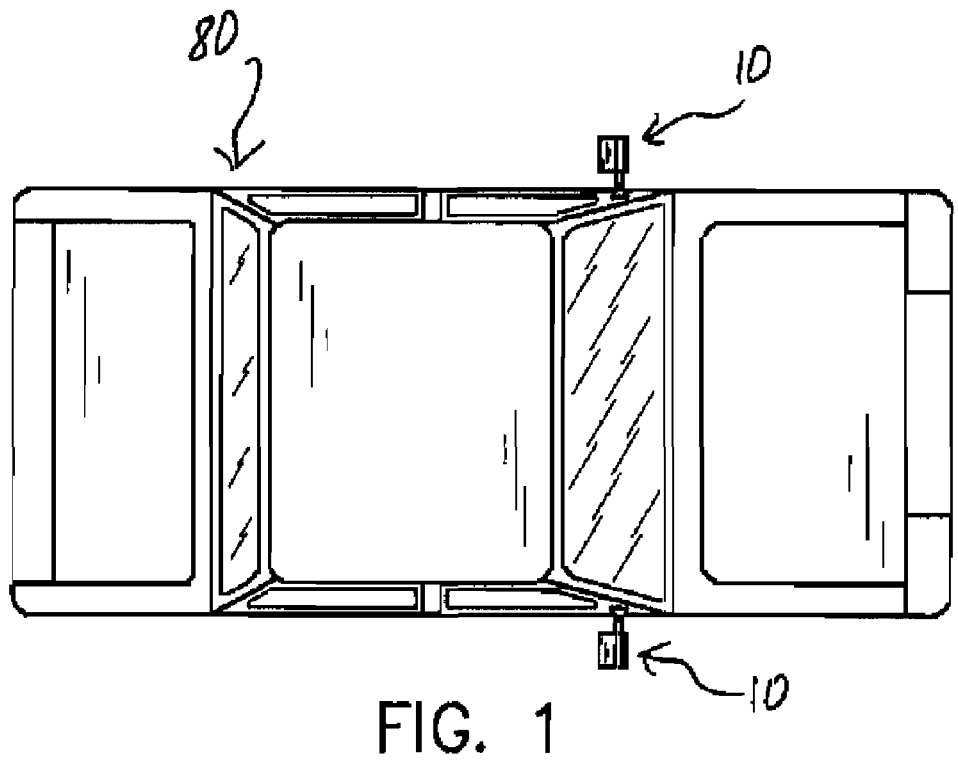
FIG. 1 is a top plan view of an auto, with one apparatus installed on side of the auto.
Figure 2:
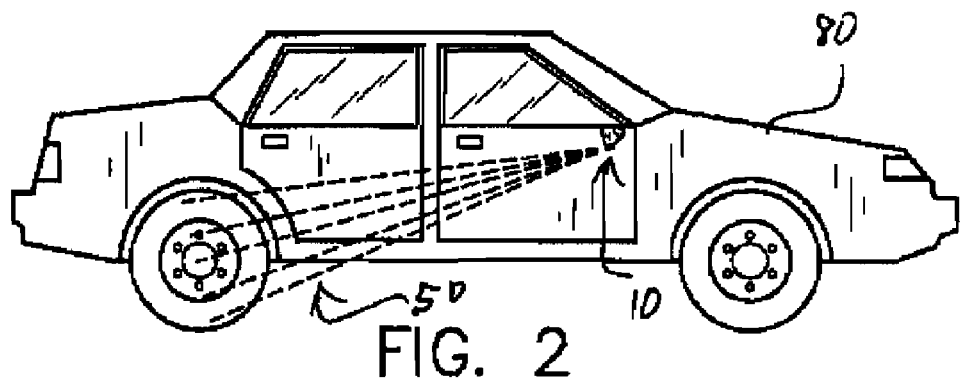
FIG. 2 is a side elevation view of the apparatus installed and functioning on the right side of an auto, the light rays aimed to the rear of the auto.
Figure 3:
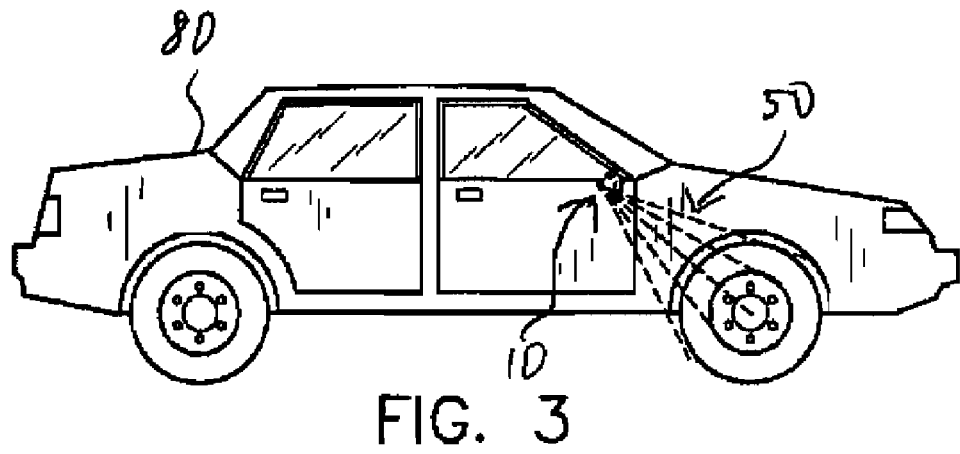
FIG. 3 is a side elevation view of the apparatus installed and functioning on the right side of an auto, the light rays aimed to the front of the auto.
Figure 4:
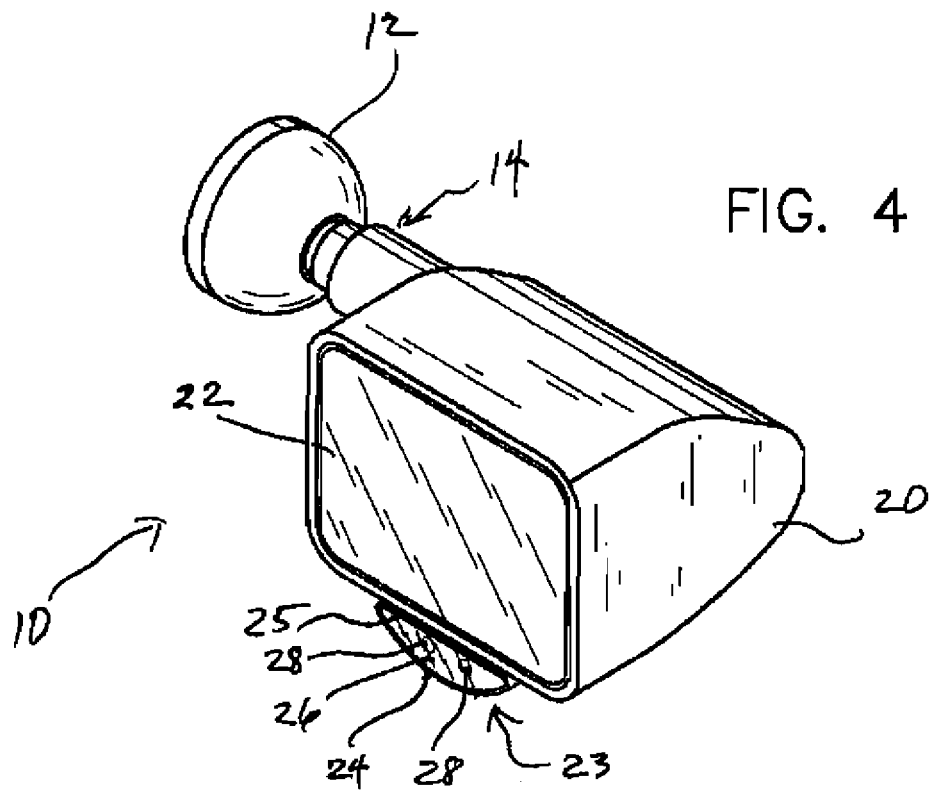
FIG. 4 is perspective view.
Figure 5:
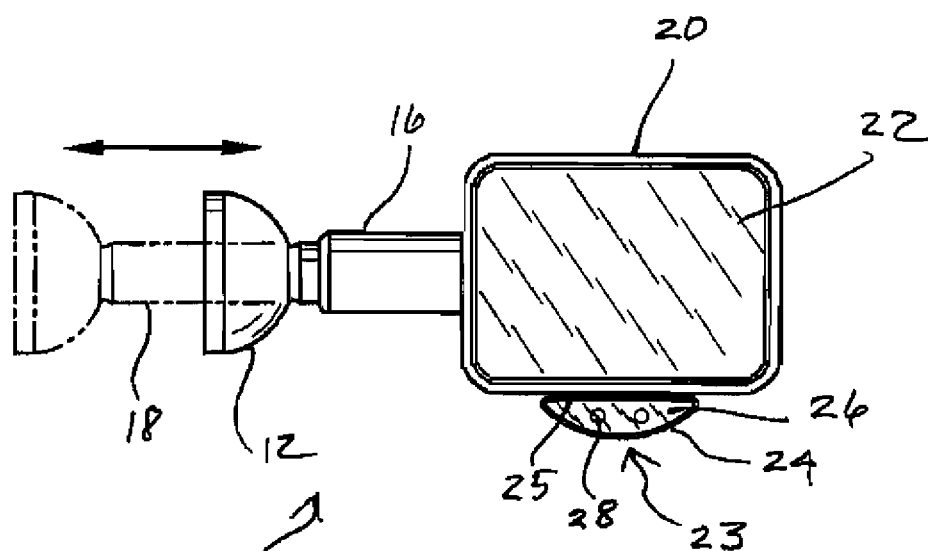
FIG. 5 is a rear elevation view illustrating telescopic stalk capability.

Referring to FIGS. 1, 2, and 3, the light projecting rear view mirror apparatus 10 is for fit to an automobile 80. The apparatus 10 replaces conventional or existing exterior rear view mirrors, and can further be fitted as original equipment on automobiles 80 of most makes. The apparatus 10 is designed for fit to a leading area of the door of the driver and the passenger. The pivotal capability shines light rays 50 as desired, forwardly, rearward, or in any direction between. The leading edge of the mirror housing 20 is slimmer than the rear of the housing 20, which contains the mirror 22, so that aerodynamic principles are observed.

Referring to FIGS. 4-8, the apparatus 10 comprises a base 12 for attachment to the automobile 80. The telescopic stalk 14 extends from the base 12. The stalk comprises an inner cylinder 18 attached to the base 12.

The outer cylinder 16 is slideably and rotatably fitted around the inner cylinder 18. The mirror housing 20 is affixed to the outer cylinder 16. The mirror housing 20 is thereby capable of telescoping from a retracted position to an extended position, as in FIG. 5. The mirror 22 is disposed within the rear portion of the mirror housing 20. The light case 23 is pivotally affixed to the bottom of the mirror housing 20. The light case 23 is capable of a full 360 degrees of pivot, thereby enabling a user to direct the light rays 50 accordingly. The flat top 25 of the light case 23 is disposed adjacent to the mirror housing 20 for an aesthetic, aerodynamic fit. At least one light 28 is disposed within the light case 23. The illustrated embodiment of the light case 23 provides two lights 28. The lights 28 are LED's (light emitting diodes) so that heat buildup is not of concern. The removable lens 26 covers the lights 28 within the light case 23. Electrical connectivity (not shown) is provided for connecting each light 28 to the automobile 80. The telescoping capability of the mirror housing 20 provides for extending the light case 23, and hence the lights 28 within, beyond any obstacles of the auto 80, such as bulging fenders and the like, in projecting light rays 50. Further, the telescopic capability of the housing 20 provides for light rays 50 to shine from an outward position relative to the auto 80 back toward the auto 80 as needed, for better vision of lug nuts and the like in changing a tire, as example. The light case 23 provides a convex bottom 24 for both aesthetic appeal and aerodynamics.

With respect to the above description then, it is to be realized that the optimum dimensional relationships for the parts of the light projecting rearview mirror apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the light projecting rearview mirror apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the light projecting rearview mirror apparatus may be used.

Therefore, the foregoing is considered as illustrative only of the principles of the light projecting rearview mirror apparatus. Further, since numerous modifications and changes will readily occur to those skilled in the art, it is not desired to limit the light projecting rearview mirror apparatus to the exact construction and operation shown and described, and accordingly, all suitable modifications and equivalents may be resorted to, falling within the scope of the light projecting rearview mirror apparatus.

What is claimed is:

1. A light projecting rear view mirror apparatus for attachment to an automobile, the apparatus comprising:
   a base for attachment to the automobile;
   a telescopic stalk extended from the base;
   a mirror housing affixed to the stalk;
   a mirror within the mirror housing;
   a 360-degree pivotable light case pivotally affixed to a bottom of the mirror housing;
   a flat top and a convex bottom disposed on the light case, the flat top flush with the bottom of the mirror housing, and the convex bottom's curvature extending downwardly from the flat top so as to be positioned opposite the flat top;
   at least one light within the light case;
   a removable lens covering the light of the light case;
   electrical connectivity for connecting each light to the automobile.

2. A light projecting rear view mirror apparatus for attachment to an automobile, the apparatus comprising:
   a base for attachment to the automobile;
   a telescopic stalk extended from the base;
   a mirror housing affixed to the stalk;
   a mirror within the mirror housing;
   a 360-degree pivotable light case pivotally affixed to a bottom of the mirror housing;
   a flat top and a convex bottom disposed on the light case, the flat top flush with the bottom of the mirror housing, and the convex bottom's curvature extending downwardly from the flat top so as to be positioned opposite the flat top;
   at least one light within the light case;
   a removable lens covering the light of the light case;
   electrical connectivity for connecting each light to the automobile;

wherein the telescopic stalk further comprises an inner cylinder attached to the base;
an outer cylinder slideably fitted around the inner cylinder.

3. A light projecting rear view mirror apparatus for attachment to an automobile, the apparatus comprising:
   a base for attachment to the automobile;
   a telescopic stalk extended from the base, the stalk further comprising;
      an inner cylinder attached to the base;
      an outer cylinder slideably and rotatable fitted around the inner cylinder;
   a mirror housing affixed to the outer cylinder;
   a mirror within the mirror housing;
   a light case pivotally affixed to a bottom of the mirror housing;
   a flat top and a convex bottom disposed on the light case, the flat top flush with the bottom of the mirror housing, and the convex bottom's curvature extending downwardly from the flat top so as to be positioned opposite the flat top;
   at least one light within the light case;
   a removable lens covering the light of the light case;
   electrical connectivity for connecting to each light to the automobile.

4. A light projecting rear view mirror apparatus for attachment to an automobile, the apparatus comprising:
   a base for attachment to the automobile;
   a telescopic stalk extended from the base, the stalk further comprising;
      an inner cylinder attached to the base;
      an outer cylinder slideably and rotatable fitted around the inner cylinder;
   a mirror housing affixed to the outer cylinder;
   a mirror within the mirror housing;
   a light case pivotally affixed to a bottom of the mirror housing;
   a flat top and a convex bottom disposed on the light case, the flat top flush with the bottom of the mirror housing, and the convex bottom's curvature extending downwardly from the flat top so as to be positioned opposite the flat top;
   at least one light within the light case;
   a removable lens covering the light of the light case;
   electrical connectivity for connecting to each light to the automobile;
   360 degree pivot of the pivotally attached light case; and
   a convex bottom of the light case.

5. A light projecting rear view mirror apparatus for attachment to an automobile, the apparatus comprising:
   a base for attachment to the automobile;
   a telescopic stalk extended from the base, the stalk further comprising;
      an inner cylinder attached to the base;
      an outer cylinder slideably and rotatable fitted around the inner cylinder;
   a mirror housing affixed to the outer cylinder;
   a mirror within the mirror housing;
   a light case pivotally affixed to a bottom of the mirror housing;
   a flat top and a convex bottom disposed on the light case, the flat top flush with the bottom of the mirror housing, and the convex bottom's curvature extending downwardly from the flat top so as to be positioned opposite the flat top;
   at least one light within the light case;
   a removable lens covering the light of the light case;
   electrical connectivity for connecting to each light to the automobile;
   wherein each light further comprises an LED.

6. A light projecting rear view mirror apparatus for attachment to an automobile, the apparatus comprising:
   a base for attachment to the automobile;
   a telescopic stalk extended from the base, the stalk further comprising;
      an inner cylinder attached to the base;
      an outer cylinder slideably and rotatable fitted around the inner cylinder;
   a mirror housing affixed to the outer cylinder;
   a mirror within the mirror housing;
   a light case pivotally affixed to a bottom of the mirror housing;
   a flat top and a convex bottom disposed on the light case, the flat top flush with the bottom of the mirror housing, and the convex bottom's curvature extending downwardly from the flat top so as to be positioned opposite the flat top;
   at least one light within the light case;
   a removable lens covering the light of the light case;
   electrical connectivity for connecting to each light to the automobile;
   360 degree pivot of the pivotally attached light case;
   wherein each light further comprises an LED.

* * * * *